United States Patent
Petrov et al.

(10) Patent No.: US 8,935,151 B1
(45) Date of Patent: Jan. 13, 2015

(54) MULTI-SOURCE TRANSFER OF DELEXICALIZED DEPENDENCY PARSERS

(75) Inventors: Slav Petrov, New York, NY (US); Ryan McDonald, New York, NY (US); Keith Hall, Zurich (CH)

(73) Assignee: Google Inc., Mountain View, CA (US)

( * ) Notice: Subject to any disclaimer, the term of this patent is extended or adjusted under 35 U.S.C. 154(b) by 531 days.

(21) Appl. No.: 13/313,247

(22) Filed: Dec. 7, 2011

(51) Int. Cl.
*G06F 17/20* (2006.01)
*G06F 17/28* (2006.01)
*G06F 17/27* (2006.01)
*G06F 17/21* (2006.01)
*G10L 15/00* (2013.01)
*G10L 17/00* (2013.01)
*G10L 21/00* (2013.01)

(52) U.S. Cl.
USPC ............ 704/4; 704/1; 704/5; 704/9; 704/10; 704/240; 704/250; 704/270

(58) Field of Classification Search
CPC .............. G06F 17/271; G06F 17/2827; G06F 17/2854; G06F 17/28; G06F 17/2785; G06F 17/21; G06F 17/27; G06F 17/2735; G06F 17/2809; G06F 17/2705; G06F 17/277; G06F 17/2775; G10L 15/063
USPC .................. 704/1–10, 240, 250, 270
See application file for complete search history.

(56) References Cited

U.S. PATENT DOCUMENTS

| | | | | |
|---|---|---|---|---|
| 5,475,588 A | * | 12/1995 | Schabes et al. | 704/9 |
| 5,477,450 A | * | 12/1995 | Takeda et al. | 704/2 |
| 6,330,530 B1 | * | 12/2001 | Horiguchi et al. | 704/4 |
| 6,742,001 B2 | * | 5/2004 | Ripley | 1/1 |
| 7,200,550 B2 | * | 4/2007 | Menezes et al. | 704/10 |
| 7,505,894 B2 | * | 3/2009 | Menezes et al. | 704/3 |
| 7,565,281 B2 | * | 7/2009 | Appleby | 704/2 |
| 7,577,562 B2 | * | 8/2009 | Menezes et al. | 704/7 |
| 7,698,124 B2 | * | 4/2010 | Menezes et al. | 704/3 |
| 7,970,600 B2 | * | 6/2011 | Chen et al. | 704/9 |
| 8,046,211 B2 | * | 10/2011 | Li et al. | 704/2 |
| 8,082,143 B2 | * | 12/2011 | Menezes et al. | 704/7 |
| 8,452,585 B2 | * | 5/2013 | Toutanova et al. | 704/9 |
| 8,489,385 B2 | * | 7/2013 | Etzioni et al. | 704/2 |
| 8,639,509 B2 | * | 1/2014 | Weng et al. | 704/252 |
| 8,660,969 B1 | * | 2/2014 | Hall et al. | 706/12 |
| 8,788,258 B1 | * | 7/2014 | Bangalore et al. | 704/4 |
| 8,805,676 B2 | * | 8/2014 | Anisimovich et al. | 704/9 |
| 2003/0023423 A1 | * | 1/2003 | Yamada et al. | 704/2 |

(Continued)

OTHER PUBLICATIONS

Yamada, K., & Knight, K. (Jul. 2001). A syntax-based statistical translation model. In Proceedings of the 39th Annual Meeting on Association for Computational Linguistics (pp. 523-530). Association for Computational Linguistics.*

(Continued)

*Primary Examiner* — Edgar Guerra-Erazo
(74) *Attorney, Agent, or Firm* — Middleton Reutlinger (57) ABSTRACT

A source language sentence is tagged with non-lexical tags, such as part-of-speech tags and is parsed using a lexicalized parser trained in the source language. A target language sentence that is a translation of the source language sentence is tagged with non-lexical labels (e.g., part-of speech tags) and is parsed using a delexicalized parser that has been trained in the source language to produce k-best parses. The best parse is selected based on the parse's alignment with lexicalized parse of the source language sentence. The selected best parse can be used to update the parameter vector of a lexicalized parser for the target language.

20 Claims, 4 Drawing Sheets

(56) References Cited

U.S. PATENT DOCUMENTS

| | | | | |
|---|---|---|---|---|
| 2005/0038643 | A1* | 2/2005 | Koehn | 704/2 |
| 2005/0049852 | A1* | 3/2005 | Chao | 704/9 |
| 2005/0086047 | A1* | 4/2005 | Uchimoto et al. | 704/4 |
| 2005/0171757 | A1* | 8/2005 | Appleby | 704/2 |
| 2006/0277028 | A1* | 12/2006 | Chen et al. | 704/4 |
| 2007/0239423 | A1* | 10/2007 | Miller | 704/2 |
| 2008/0319736 | A1* | 12/2008 | Toutanova et al. | 704/9 |
| 2009/0326911 | A1* | 12/2009 | Menezes et al. | 704/2 |
| 2009/0326919 | A1* | 12/2009 | Bean | 704/9 |
| 2010/0274552 | A1* | 10/2010 | Gao et al. | 704/2 |

OTHER PUBLICATIONS

Das, D., & Petrov, S. (Jun. 2011). Unsupervised part-of-speech tagging with bilingual graph-based projections. In Proceedings of the 49th Annual Meeting of the Association for Computational Linguistics: Human Language Technologies—vol. 1 (pp. 600-609). Association for Computational Linguistics.*

Jiajun Zhang; Feifei Zhai; Chengqing Zong, "Syntax-Based Translation With Bilingually Lexicalized Synchronous Tree Substitution Grammars," Audio, Speech, and Language Processing, IEEE Transactions on , vol. 21, No. 8, pp. 1586,1597, Aug. 2013 doi: 10.1109/TASL.2013.2255283.*

McDonald, R., Petrov, S., & Hall, K. (Jul. 2011). Multi-source transfer of delexicalized dependency parsers. In Proceedings of the Conference on Empirical Methods in Natural Language Processing (pp. 62-72). Association for Computational Linguistics.*

Hwa, R. (Jun. 1999). Supervised grammar induction using training data with limited constituent information. In Proceedings of the 37th annual meeting of the Association for Computational Linguistics on Computational Linguistics (pp. 73-79). Association for Computational Linguistics.*

Zeman, D., & Resnik, P. (Jan. 2008). Cross-Language Parser Adaptation between Related Languages. In IJCNLP (pp. 35-42).*

Søgaard, A. (Jun. 2011). Data point selection for cross-language adaptation of dependency parsers. In Proceedings of the 49th Annual Meeting of the Association for Computational Linguistics: Human Language Technologies: short papers—vol. 2 (pp. 682-686). Association for Computational Linguistics.*

Zeman et al.,"Cross-Language Parser Adaptation between Related Languages", in NLP for Less Privileged Languages, Jan. 2008.

* cited by examiner

MULTI-SOURCE TRANSFER OF DELEXICALIZED DEPENDENCY PARSERS

BACKGROUND

Figure 1:
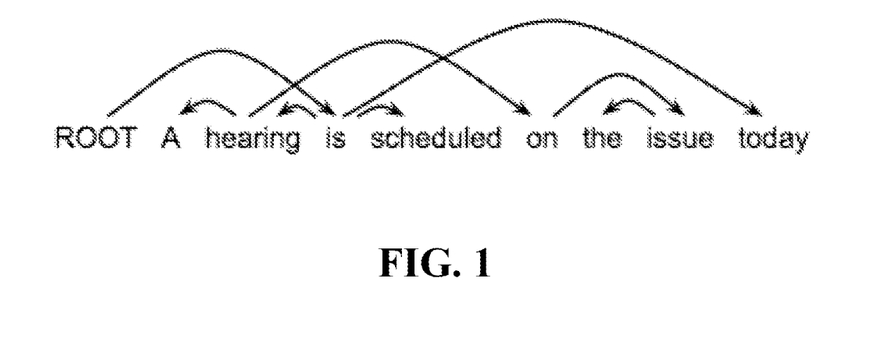
FIG. 1 shows a parse tree generated using a dependency parser according to an embodiment of the disclosed subject matter.

A dependency parser can take a tokenized input sentence (for example, part-of-speech tagged) and produce a connected tree (a parse tree) where directed arcs represent a syntactic head-modifier relationship. An example of such a tree is shown in FIG. 1. Dependency tree arcs are often labeled with the role of the syntactic relationship, e.g., is to hearing might be labeled as SUBJECT.

A parser can be trained by generating a predicted parse for a given input sentences in a given target language and comparing the predicted parse with an annotated, gold standard output that corresponds to the input. For example, a dependency parse that is generated by the system for a given sentence can be compared to a parse that was hand-annotated by a human expert for the same sentence. The parameter vector used by the parser to generate the parse can then be tuned based upon the differences between the generated parse and the gold standard parse. Such supervised training improves the likelihood that the parser will generate of more accurate parses for subsequent input sentences. Some languages lack labeled data (e.g., gold standard data) for training a parser.

BRIEF SUMMARY

In accordance with embodiments of the disclosed subject matter, dependency parsers can be created for languages for which no labeled training data is available.

A source language (e.g., English) sentence can be tagged with non-lexical tags, such as part-of-speech tags. The tagged source-language sentence can be parsed using a source language lexicalized parser that has been trained using labeled training data, e.g., from a treebank for the source language. This produces a parse of the source language sentence.

A target language (e.g., Bengali) sentence that is a translation of the source language sentence can also be tagged with non-lexical tags, such as part of speech tags. The taggers for source and target language sentences can be customized to accurately label the sentences in their respective languages. The target language sentence can be parsed using a delexicalized parser that has been trained in the source language to produce k-best parses. The best parse can be selected by comparing it to the lexicalized parse of the source language sentence. The selected best parse can be used to update the parameter vector of a lexicalized parser for the target language.

The tagged target language sentence can be parsed with a delexicalized parser that has been trained on source-language gold standard data, such as Treebank data. The target language sentence can be parsed in this way to generate a set of k-best parses for the target language sentence. The best target-language parse of the k-best parses can be selected that most closely aligns with the parse generated by the lexicalized parser of the source-language sentence. The best target-language parse can be used to update a parameter vector of a target language lexicalized parser.

In multi-source embodiments in accordance with the disclosed subject matter, the delexicalized parser can be trained using gold standard (e.g., treebank) data for several distinct languages. In an embodiment, a first set of sentences in a first language and their respective gold standard data can be concatenated with a first set of languages in a second language and their respective gold standard data. The concatenated sets of sentences and their respective gold standard data can be used to train the delexicalized parser. Sentences in any number of languages with their gold standard data can be used to train the parser. The sentences need not be grouped by language but can occur in any order, provided each sentence is properly associated with its gold standard data. Training data for the delexicalized parser can be weighted. For example, training sentences in a given language may be weighted more heavily for training purposes than sentences in another language.

The best target language parse tree of the k-best parse trees in either a single source or multi-source scenario can be selected by determining how well each of the k-best parses aligns with the gold standard parse. Any suitable alignment measurement may be used, including (without limitation) the ALIGN function described below. An example of a suitable alignment score is one that improves with the number of correctly aligned dependencies and worsens with the number of incorrectly aligned dependencies.

Additional features, advantages, and embodiments of the disclosed subject matter may be set forth or are apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

In an embodiment of the disclosed subject matter, a source side English parser can be trained on gold standard data (such as treebank data) that has been delexicalized so that the predictions of the parser rely solely on non-lexical labels such as the part-of-speech tags of the input sentence. Directly transferring delexicalized models (e.g., parsing a foreign language part-of-speech sequence with a parser trained on English) can outperform state-of-the-art unsupervised parsers by a significant margin. Thus, even for languages with no syntactic resources (or possibly even without parallel data), the disclosed subject matter can produce better results than grammar induction systems.

The delexicalized source-side parser can be used to seed a perceptron learner for the target language. The model can be trained to update towards parses that are in high agreement with a source-side English parse based on constraints drawn from alignments in the parallel data. The resulting parser can consistently improve on the directly transferred delexicalized parser, reducing relative errors. Further, transferring parsers from multiple source languages can further reduce errors over the directly transferred English baseline.

In an embodiment, a consistent set of part-of-speech tags can be used across languages and treebanks. For example, the tagset can include NOUN (nouns) VERB (verbs) ADJ (adjectives) ADV (adverbs) PRON (pronouns) DET (determiners), ADP (prepositions or postpositions), NUM (numerals), CONJ (conjunctions), PRT (particles), PUNC (punctuation marks) and X (a catch-all tag.) Language-specific part-of-speech tags in the treebanks can be replaced with these universal tags. A corpus of parallel text (e.g., the Europarl corpus version 5) can be used for each pair of languages.

Parsing models can be based on a transition-based dependency parsing paradigm. For example, models can use an arc-eager transition strategy and can be trained using an averaged perceptron algorithm. For treebanks with non-projective trees, the pseudo-projective parsing techniques can be used to transform the Treebank into projective structures.

The systems used can be evaluated using any suitable scoring system, such as an Unlabeled Attachment Score ("UAS"), which can be the percentage of words (e.g., ignoring punctuation tokens) in a corpus that modify the correct head. Both fold-standard and predicted part-of-speech tags can be evaluated.

For purposes of illustration only, and not to limit the scope of the claims, an embodiment is described that transfers from English to other languages. The disclosed subject matter is not limited to transfers from English and can be used to transfer from any first language to any second language.

Discriminatively-trained dependency parsers can rely heavily on delexicalized tagging features, such as part-of-speech tagging features. For example, part-of-speech tags contain a significant amount of information for unlabeled dependency parsing. With a universal tagset, the target language can be directly parsed with a source-language parser without relying on parallel corpora in accordance with the disclosed subject matter. For example, UAS for a delexicalized parser can be comparable to the UAS of a full-featured parser for a given language. Thus, the target language can be parsed with the source language parser without parallel corpora in accordance with embodiments of the disclosed subject matter. This can be done across languages and treebank standards.

The direct transfer approach in accordance with the disclosed subject matter need not rely on projecting syntax across aligned parallel corpora. Rather, signals can originate from aligned source and target sentences and the agreement in their corresponding parses. The method described in Table 1 (below) shows a set of target language sentences labeled with a direct transfer parser (line 1). These parsed sentences can be used to seed a new parser by training a parameter vector using the predicted parses as a gold standard via standard perceptron updates for J rounds (lines 3-6). This can generate a parser that emulates the direct transfer parser, but has not been lexicalized and is working in the space of target language sentences. The method can iterate over the sentences in the parallel corpus. It can parse the English sentence with an English parser that is lexicalized (line 8). It uses the current target language vector parameter to create a k-best parse list for the target sentence (line 9). From this list, it can select the parse whose dependencies align most closely with the English parse via a pre-specified alignment (line 10 and, e.g., the ALIGN function specified below). It then can use the selected parse as a proxy to the gold standard parse to update the parameters (line 11).

TABLE 1

Notation:
  x: inputsentence
  y: dependencytree
  a: alignment
  w: parametervector
  $\phi$ (x,y): featurevector
  DP: dependencyparser (DP:x→y)
Input:
  $X = \{x_i\}_{i-1}^n$: target language sentences
  $P = \{(x_i^s, x_i^t a_i)\}_{i-1}^m$: alignedsource-targetsentences
  $DP_{delex}$: delexicalizedsourceparser
  $DP_{lex}$: lexicalizedsourceparser
Method:
  1. Let $X' = \{(x_i, y_i)\}_{i-1}^n$, where $y_i = DP_{delex}(x_i)$
  2. w = 0
  3. for j : 1 . . . J
  4.     for $x_i$: $x_i$ . . . $x_n$,
  5.       Let y =argmax$_y$ w · $\phi(x_i, y)$
  6.       w = w + $\phi$ ($x_i, y_i$) − $\phi$ ($x_i, y$)
  7. for $(x_i^s, x_i^t, a_i) : (x_1^s, x_1^t, a_1) \ldots (x_m^s x_m^s a_m)$
  8.     Let $y_s = DP_{lex}(x_i^s$
  9.     Let $Y_t = \{y_i^1 \ldots y_i^k\}$, where:
        $y_i^k$ =argmax$_{y \in \{y_i^1 \ldots y_i^{k-1}\}}$w · $\phi(x_i^t, y)$
  10.   Let $y_t$ =argmax$_{y_t \in y_t'}$ ALIGN $(y_s, y_t, a_i)$ The parser thus begins with non-random accuracies by emulating the direct transfer model and slowly tries to induce better parameters by selecting parses from its k-best list that are considered "good" by some external metric. The algorithm then updates towards that output. "Goodness" can be determined through a pre-specified sentence alignment and how well the target language parse aligns with the English parser. As a result, the model can converge to a state where it predicts target parses that align as closely as possible with corresponding English parses. Since the learner is seeded with the direct transfer parser, the parameters are biased to select parses that both align well and also have high scores under the direct transfer model. This can help not only constraint the search space at the start of learning, but also can help to bias dependencies between words that are not part of the alignment.

Any suitable function can be used to measure alignment. For example, let a=$\{(s_{(1)}, t_{(1)}), \ldots, (s_{(n)}, t_{(n)})\}$ be an alignment where $s_{(i)}$ is a word in the source sentence and $x_s$ (not necessarily the ith word) and $t_{(i)}$ is a word in the target sentence $x_{(i)}$ (again, not necessarily the ith word). The notation $(s_{(1)}, t^{(i)}) \in a$ indicates that two words are the ith aligned pair in a. The ALIGN function can be defined as follows:

$$\text{ALIGN}(y_s, y_t, a) = \sum_{\substack{(s_{(i)}, t_{(i)}) \in a \\ (s_{(j)}, t_{(j)}) \in a}} \text{SCORE}(y_s, y_t, (s_{(i)}, s_{(j)}), (t_{(i)}, t_{(j)}))$$

$$\text{SCORE}(y_s, y_t, (s_{(i)}, s_{(j)}), (t_{(i)}, t_{(j)})) =$$

-continued $$\begin{cases} +1 & \text{if } (s_{(i)}, s_{(j)}) \in y_s \text{ and } (t_{(i)}, t_{(j)}) \in y_t \\ -1 & \text{if } (s_{(i)}, s_{(j)}) \in y_s \text{ and } (t_{(i)}, t_{(j)}) \notin y_t \\ -1 & \text{if } (s_{(i)}, s_{(j)}) \notin y_s \text{ and } (t_{(i)}, t_{(j)}) \in y_t \\ 0 & \text{otherwise} \end{cases}$$

The notation $(i, j) \in y$ indicates that a dependency from head i to modifier j is in tree y. The ALIGN function rewards aligned head-modifier pairs and penalizes unaligned pairs when a possible alignment exists. For all other cases it is agnostic, i.e., when one or both of the modifier or head are not aligned.

Figure 2:
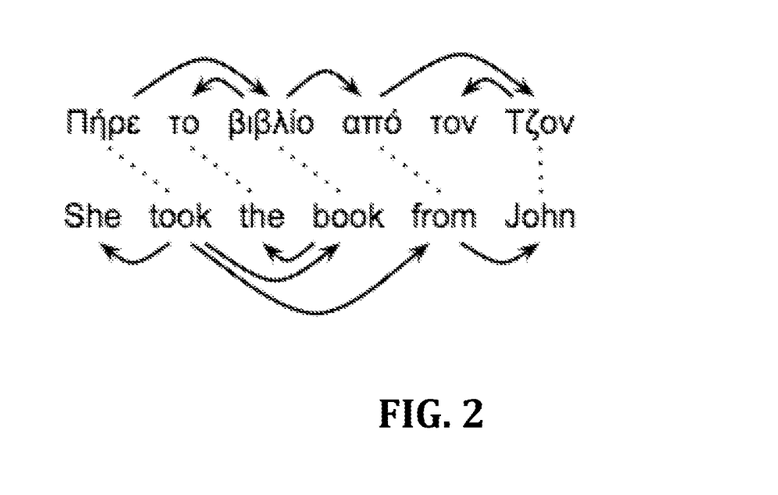
FIG. 2 shows a Greek and English sentence pair to show word alignments according to an embodiment of the disclosed subject matter.

FIG. 2 shows an example of aligned English-Greek sentences, the English parse and a potential Greek parse. In this case, the ALIGN function returns a value of 2. This is because there are three aligned dependencies: took → book, book → the and from → john. These add 3 to the score. There is one incorrectly aligned dependency: the preposition mistakenly modifies the noun on the Greek side. This subtracts 1. Finally, there are two dependencies that do not align: the subject on the English side and a determiner to a proper noun on the Greek side. These do not affect the result.

The example discussed above illustrated (without limitation) the disclosed subject matter with an example in which an English parser is transferred to a new target language. There are over 20 treebanks available for a variety of language groups including Indo-European, Altaic (including Japanese), Semitic, and Sino-Tibetan. The results of the disclosed subject matter can be further improved by using multiple non-target languages. For example, a multi-source direct transfer parser for Danish (the target language in this example) can be trained by, e.g., first concatenating the training corpora of several other languages, training a delexicalized parser on this data and then directly using this parser to analyze the Danish test data. For the multi-source projected parser, the procedure can be identical to the single source system described above except that the multi-source direct transfer model is used to seed the algorithm instead of the English-only direct transfer model. Multi-source projected systems can provide accuracies near that of the single-best source language and significantly better than the average source UAS. Thus, even simple concatenation can provide strong performance gains. More sophisticated approaches can include weighting certain subsets of sentences drawn from multiple sources. For example, sentences from a first source language may be weighed more heavily than sentences from a second source language, depending, for example, on the target language. Factors affecting the weighting can include data about source languages that are known to produce better results for a given target language, data about the quality of the parallel data for a particular source language or subset(s) of sentences across languages, information about notation schemes for subset(s) of sentences, etc.

Figure 3:
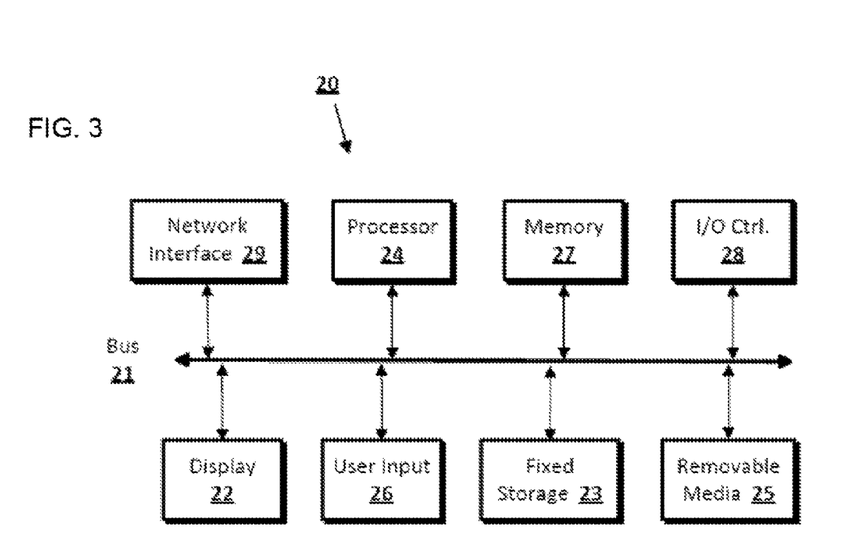
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) that controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet Service Provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
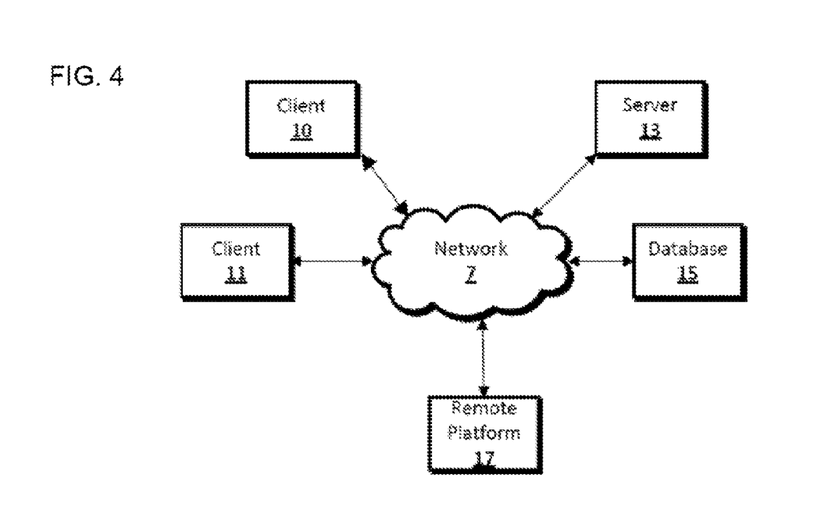
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

Figure 5:
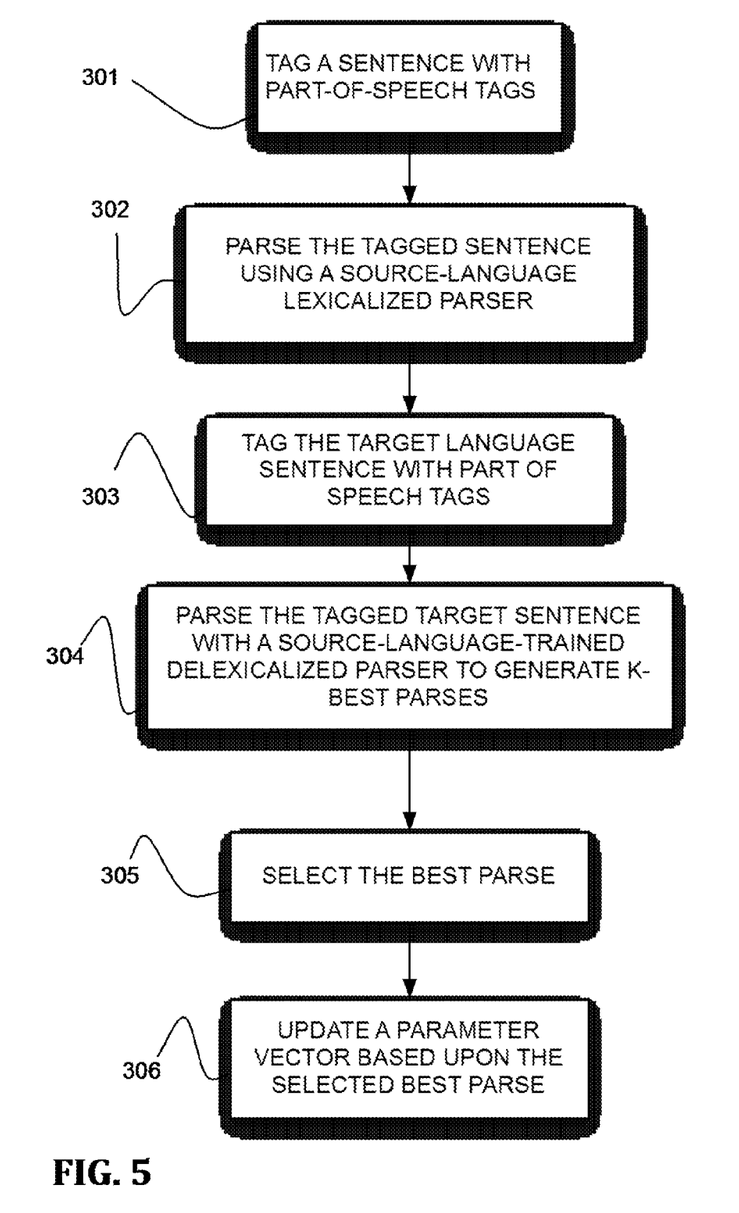
FIG. 5 shows a flowchart for transferring a dependency parser to a target language according to an embodiment of the disclosed subject matter.

An embodiment of the method in accordance with the disclosed subject matter can be implemented as shown in FIG. 5, which is exemplary and meant to illustrate and not limit the scope of the claims. A sentence is tagged with delexicalized labels such as part-of-speech tags, 301. The tagged sentence is parsed using a lexicalized parser trained on a source language, 302. A target language sentence is tagged with part-of-speech tags or any other suitable delexicalized labels, 303. The tagged target sentence is parsed using a delexicalized parser that has been trained on the source language to generate k-best parses, 304. The best parse is selected 305, e.g., based on an alignment score of the parse. A parameter vector for a lexicalized parser for the target language is updated based upon the selected best parse, 306.

Figure 6:
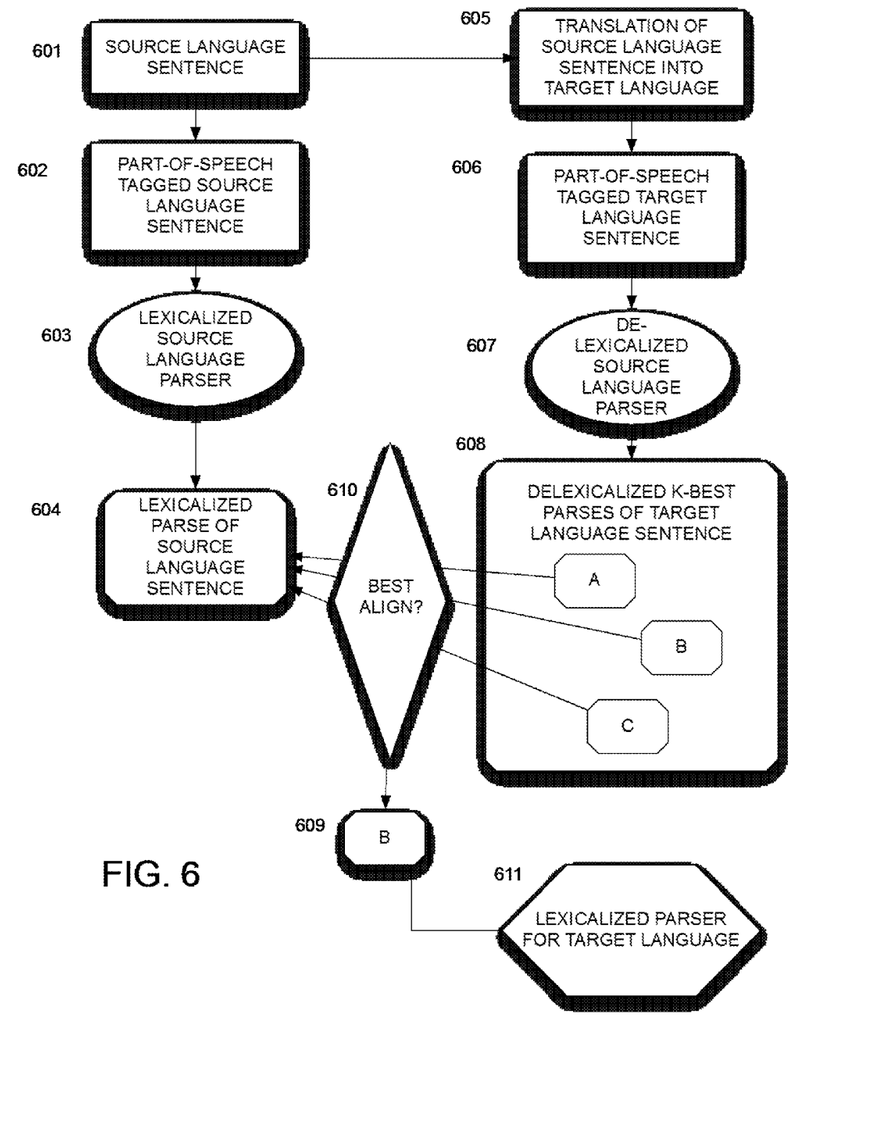
FIG. 6 shows an embodiment of transferring a dependency parser to a target language according to an embodiment of the disclosed subject matter.

An embodiment of the disclosed subject matter can be implemented as shown in FIG. 6. A source language sentence 601 is tagged with non-lexical tags 602, such as part-of-speech tags and is parsed using a lexicalized parser 603 trained in the source language to produce a source language lexicalized parse 604. A target language sentence 605 that is a translation of the source language sentence is tagged with non-lexical labels 606 (e.g., part-of speech tags) and is parsed using a delexicalized parser 607 that has been trained in the source language to produce k-best parses 608. The best parse 609 is selected based on the parse's alignment 610 with lexicalized parse of the source language sentence 604. The selected best parse 609 can be used to update the parameter vector of a lexicalized parser 611 for the target language.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method, comprising:
 tagging a source-language sentence with parts of speech tags;
 parsing, utilizing one or more processors, the tagged source-language sentence using a source language lexicalized parser to generate a parse tree for the sentence, where the source language lexicalized parser has been trained using source-language Treebank data;
 tagging a target-language sentence with parts of speech tags, where the target-language sentence is a translation of the source-language sentence;
 parsing, utilizing one or more of the processors, the tagged target-language sentence with a delexicalized parser to generate a set of k-best parse trees for the target-language sentence, where the delexicalized parser has been trained using source-language Treebank data;
 selecting the best target-language parse tree of the k-best parse trees that most closely aligns with the lexicalized parse tree of the source-language sentence; and
 updating a parameter vector of a target language lexicalized parser based upon the selected best target-language parse tree.

2. A method, comprising:
 tagging a source-language sentence with non-lexical tags;
 parsing, utilizing one or more processors, the tagged source-language sentence using a source language lexicalized parser to generate a parse tree for the sentence, where the source language lexicalized parser has been trained using gold standard source-language data;
 tagging a target-language sentence with non-lexical tags, where the target-language sentence is a translation of the source-language sentence;
 parsing, utilizing one or more of the processors, the tagged target-language sentence with a delexicalized parser to generate a set of k-best parse trees for the target-language sentence;
 selecting the best target-language parse tree of the k-best parse trees that most closely aligns with the lexicalized parse tree of the source-language sentence; and
 updating a parameter vector of a target language lexicalized parser based upon the selected best target-language parse tree.

3. The method of claim 2, wherein the non-lexical tags are parts of speech tags.

4. The method of claim 2, wherein the gold standard data is Treebank data.

5. The method of claim 2, wherein the delexicalized parser has been trained using source-language gold standard data.

6. The method of claim 2, wherein the delexicalized parser has been trained using gold standard data for a plurality of distinct languages.

7. The method of claim 2, wherein the delexicalized parser has been trained using concatenating gold standard data for each of a plurality of distinct languages.

8. The method of claim 2, wherein the delexicalized parser has been trained using weighted gold standard data corresponding to each of a plurality of distinct languages.

9. The method of claim 8, wherein the gold standard data includes a subset of gold standard data for each of the plurality of languages and a weight is assigned to each of the subsets of gold standard data.

10. The method of claim 2, wherein the selecting the best target-language parse tree of the k-best parse trees that most closely aligns with the lexicalized parse tree of the source-language sentence comprises calculating an alignment score that improves with the number of correctly aligned dependencies and worsens with the number of incorrectly aligned dependencies.

11. The method of claim 2, wherein the source-language sentence is one of a plurality of sentences that includes a plurality of subsets of sentences, at least two of the subsets of sentences are in distinct languages.

12. A system, comprising;
a processor;
memory coupled to said processor, where the memory stores instructions to be executed by the processor to perform steps comprising:
tagging a source-language sentence with non-lexical tags;
parsing the tagged source-language sentence using a source language lexicalized parser to generate a parse tree for the sentence, where the source language lexicalized parser has been trained using gold standard source-language data;
tagging a target-language sentence with non-lexical tags, where the target-language sentence is a translation of the source-language sentence;
parsing the tagged target-language sentence with a delexicalized parser to generate a set of k-best parse trees for the target-language sentence;
selecting the best target-language parse tree of the k-best parse trees that most closely aligns with the lexicalized parse tree of the source-language sentence; and
updating a parameter vector of a target language lexicalized parser based upon the selected best target-language parse tree.

13. The system of claim 12, wherein the non-lexical tags are parts of speech tags.

14. The system of claim 12, wherein the gold standard data is Treebank data.

15. The system of claim 12, wherein the delexicalized parser has been trained using source-language gold standard data.

16. The system of claim 12, wherein the delexicalized parser has been trained using gold standard data for a plurality of distinct languages.

17. The system of claim 12, wherein the delexicalized parser has been trained using concatenating gold standard data for each of a plurality of distinct languages.

18. The system of claim 12, wherein the delexicalized parser has been trained using weighted gold standard data corresponding to each of a plurality of distinct languages.

19. The system of claim 18, wherein the gold standard data includes a subset of gold standard data for each of the plurality of languages and a weight is assigned to each of the subsets of gold standard data.

20. The system of claim 12, wherein the selecting the best target-language parse tree of the k-best parse trees that most closely aligns with the lexicalized parse tree of the source-language sentence comprises calculating an alignment score that improves with the number of correctly aligned dependencies and worsens with the number of incorrectly aligned dependencies.

* * * * *